United States Patent [19]

Rosen

[11] 4,431,458
[45] Feb. 14, 1984

[54] METHOD FOR REMOVING POLYVINYL COATINGS FROM METAL WITH TETRAHYDROFURAN

[76] Inventor: Harold Rosen, 5 Creek Side La., St. Louis County, Mo. 63141

[21] Appl. No.: 366,485

[22] Filed: Apr. 8, 1982

[51] Int. Cl.$^3$ ............................ B08B 3/08; B08B 7/00
[52] U.S. Cl. ...................................... 134/38; 134/25.1
[58] Field of Search ................ 134/2, 12, 34, 38, 25.1; 521/46.5

[56] References Cited

U.S. PATENT DOCUMENTS

| | | | |
|---|---|---|---|
| Re. 27,432 | 7/1972 | Torrenzano | 134/12 |
| 3,475,218 | 10/1969 | Torrenzano | 134/12 X |
| 3,975,208 | 8/1976 | Tate | 134/38 X |
| 3,997,360 | 12/1976 | Testa | 134/38 X |
| 3,998,655 | 12/1976 | Benetta | 134/38 X |
| 4,366,006 | 12/1982 | Ferer | 134/38 |

Primary Examiner—Sidney Marantz
Attorney, Agent, or Firm—Kalish & Gilster

[57] ABSTRACT

The method of recovering metal from a coated condition wherein the same is encased within polyvinyl chloride which comprises disposing the coated metal upon a mesh or other perforated support within a vessel, immersing the same in a bath of tetrahydrofuran under ambient conditions, then closing the vessel containing said mesh or perforated support and permitting the treated material to remain therein in immersed state for a period of time commensurate with the quantity of material to be de-coated and with the thickness of such coating. However, with customary coatings in the order of approximately $\frac{1}{4}''$ to $\frac{3}{8}''$, a period of about one hour is adequate and such should be relatively indicative of the periods of time necessary with thicker coatings.

3 Claims, No Drawings

METHOD FOR REMOVING POLYVINYL COATINGS FROM METAL WITH TETRAHYDROFURAN

BACKGROUND AND SUMMARY OF THE INVENTION

This invention relates in general to scrap metal salvage and, more particularly, to the recovery of metal which has been encased in a coating of polyvinyl chloride.

Heretofore, various procedures have been attempted to recover metals, such as copper, from insulation, as well as from a multiplicity of conditions of use wherein the same have been covered by nonmetallic organic coatings. Such efforts have been relatively complex and costly as exemplified by the disclosure of U.S. Pat. No. 2,815,278 which teaches the charging of organically coated metal to a furnace for effecting destructive distillation of the coating and involving melting of the metal to be recovered. More recently, polyvinyl chlorides have come into widespread use as insulation material of choice, but the removal of the same has proved consistently difficult so that recovery of metals, such as, copper insulated with such material, has been of but limited extent, thereby causing a substantial economic loss. Techniques for removing polyvinyl chloride coatings have been of various types; one of which is mechanical in nature, wherein the scrap is subjected to chopping by suitable instrumentality.

Another method is taught by U.S. Pat. No. 4,189,329 wherein the metal having a halogen-containing plastic coating is immersed within a heated fluidized bed containing a reactive carbonate composition for effecting thermal decomposition of the coating. The bath is heated to and maintained at the appropriate temperature for effecting such thermal decomposition, but being below calcination temperature. In this connection U.S. Pat. No. 3,480,477 also discloses a method for removing electrolytic grade copper from copper wire which has been insulated primarily by polyvinyl chloride, wherein the wire is chopped and sieved into small pieces and then placed in a sealed autoclave with circulation of petroleum distillate oil therethrough having certain prescribed ingredients, and at a temperature of at least 450° F.

The Schub U.S. Pat. No. 2,435,239 discloses a process for removing a polyvinyl formal resin coating which involves treating the resin with a concentrated aqueous solution of formic acid for penetrating the resin and effecting a softening and swelling thereof to conduce to mechanical removal.

U.S. Pat. No. 2,417,468 reveals a process for removing a plastic coating from metal, such as copper wire, which comprehends subjecting the coated wire to a hot bath as in the neighborhood of 400°–500° F. of fatty acids of at least 16 carbon atoms for causing swelling of the coating and breaking the bond thereof. A second heated bath is then used of a predetermined solvent for dissolving the softening agent and rendering the coating readily strippable.

In view of the foregoing, it will be seen that among the expedients heretofore utilized has been mechanical removal without prior treatment; subjection of the plastic clad wire to various heated baths for swelling and loosening of the coating to make it more readily removable; as well as decomposition of the coating through suitable reagents under prescribed conditions, all of which have recognized drawbacks in view of the complexity of the last two mentioned types of procedures and the time consuming, difficult method of removal through mechanical means in view of the bond between the copper and the coating.

It must be further recognized that with polyvinyl chloride there is implicit a pollution hazard since burning of the same in the atmosphere causes the released chlorine, either as a gas or as hydrogen chloride, to be charged to the ambience wherein hydrochloric acid is developed by reason of atmospheric moisture content. This acid is deleterious to many materials incorporated in neighboring constructions, as well as being unpleasant for individuals.

Therefore, it has been found that a procedure chemically in character which does not involve burning, but which may be effected under atmospheric conditions, thereby obviating the need for carefully controlled reagent baths with the attendant use of costly equipment and the elimination of the need for laborious mechanical stripping, has been indicated. The present invention thus contemplates the simple step of subjecting the polyvinyl chloride clad metal, such as copper wire, to a bath of tetrahydrofuran, sometimes called furfuran, under ambient conditions bringing about a removal of the resin coating without release of any polluting ingredients to the atmosphere and without requiring any mechanical stripping steps.

Therefore, it is an object of the present invention to provide a method for recovering of metal, primarily copper, from a coating of organic material, such as, particularly, polyvinyl chlorine, in a one step procedure which obviates release of chloride to the atmosphere and which does not require physical stripping of the coating.

Another object of the present invention is to provide a method of the character stated which is performed with facility, requiring very simply constructed, easily operated, and highly durable equipment, and without necessitating any particularly developed skills on the part of the operator.

It is a further object of the present invention to provide a method for recovering metal, exemplary of which is copper wire, normally encased within polyvinyl chloride which may be accomplished in minimum time and at marked economies over procedures heretofore adopted and practiced, all of the same being brought about without pollution.

It is a still further object of the present invention to provide a method for recovering metal, such as copper, from polyvinyl chloride coatings which does not alter in any way, or adversely affect, the metal salvaged so that the same is capable of further processing, if desired, in accordance with current techniques.

DESCRIPTION OF THE INVENTION

In essence, the present invention contemplates the recovery of metal, such as, copper in wire form, from insulating coatings, as of polyvinyl chloride, in a procedure which is easily accomplished under atmospheric conditions and without danger of releasing chlorine as a pollutant to the ambience.

The method of the present invention comprehends providing a quantity of scrap or related material consisting of metal encased within a coating of polyvinyl chloride for recovery of the metal, such as copper wire, for further useful purposes. The scrap material is thus charged within a suitably closable vessel having a horizontal mesh or perforated support extending thereacross, and with the mesh size or openings being sufficiently fine so as to avoid the inadvertency of any untreated coated material falling therethrough and into the base of the vessel; it being recognized that the mesh or perforated support is located spacedly from the bottom of such vessel. With the scrap material thus resting upon such mesh, tetrahydrofuran is charged to the vessel in such an amount as to fully cover the material to be treated. The vessel is then closed and the coated material is permitted to soak in the tetrahydrofuran for a predetermined period of time, depending upon the thickness of the coating to be removed, with the recognition that a thickness in the order of ¼" to ⅜" would require a period of about one hour, and other thicknesses in commensurate time junctures. It will thus be seen that there is no preset temperature or pressure, but that the soaking simply occurs under obtaining atmospheric or ambient conditions.

By virtue of the bath thus provided, the coating will tend to soften, becoming somewhat flowable thereby, losing its adhesion to the accepted metal, and altering its state from a solid set nature to a relatively thick syrupy flowable condition, in which state, through gravity, it will flow downwardly through the mesh and into the base of the vessel. It is believed that the resinous material being removed inherently contains a certain porosity or lacunae-like structure which permits acceptance of the tetrahydrofuran so that the same, through the extensive surface exposure, facilitates the softening of the plastic. The now denuded metal will be retained upon the mesh or perforated support and upon opening of the vessel will thus be exposed for simple withdrawal in an uncoated state.

If desired, this procedure may be expedited by subjecting the vessel during the soaking period to agitation by any suitable means, all of which are well known in the art, which agitation will expedite the reaction of the tetrahydrofuran on the plastic resin and cause the procedure to require about approximately one half the length of time necessary without such agitation. Thus, agitation serves to reduce whatever time period may be necessary for the particular thickness by approximately one-half.

It will be seen that the present invention has many marked attributes over procedures for recovery of metal from polyvinyl chloride heretofore as it does not necessitate the development of fluidized or other baths at relatively elevated temperatures requiring very carefully and closely controlled operating conditions, as well as specialized costly equipment. Nor does the present invention provide the hazard of releasing polluting chlorine to the atmosphere. Also obviated by the present invention is the need for effecting the mechanical stripping of the coating from the copper either prior to subjection of the same to an agent for swelling and loosening the coating, or to the same without preliminary treatment which involves the breaking of the physical affinity between the metal and the coating.

Needless to say, the present invention is very simply effected, being of a one step nature, and requiring equipment of the most simple form.

Having described my invention, what I desire to obtain by Letters Patent and claim is:

1. A method for recovery of copper having a polyvinyl chloride coating thereon consisting essentially of providing a closable vessel having a perforated support disposed therein spacedly above the bottom thereof, placing the polyvinyl chloride coated copper to be treated upon said perforated support, then charging tetrahydrofuran to the vessel in such quantity as to immerse the said coated copper to be treated, then closing the vessel, permitting the vessel to remain in such closed state for a period of time commensurate with that required to render the coating flowable for passage through the perforated support to the bottom of said vessel, such being determinable by the thickness of the coating to be removed, then opening the vessel and then withdrawing the now denuded copper from the perforated support, said method being practiced under ambient conditions.

2. A method for recovery of copper having a polyvinyl chloride coating thereon as defined in claim 1 and further characterized by the immersion of the coated material in the tetrahydrofuran being for a period of about one hour when the polyvinyl coating is of a thickness within the range of approximately ¼" to ⅜".

3. A method for recovery of copper having a polyvinyl chloride coating thereon consisting essentially of providing a closable vessel having a perforated support disposed therein spacedly above the bottom thereof, placing the polyvinyl chloride coated copper to be treated upon said perforated support, then charging tetrahydrofuran to the vessel in such quantity as to immerse the said coated copper to be treated, then closing the vessel, subjecting the now closed vessel to agitation for a period of time approximately one-half of that required when agitation is not exercised for rendering the polyvinyl chloride coating flowable for the particular thickness thereof whereby the same now in fluid state passes through the perforated support for collection in the bottom of the vessel, then discontinuing the agitation, then opening the vessel, and then removing the now denuded copper from the perforated support, said method being practiced under ambient conditions.

* * * * *